(12) United States Patent
Kepler et al.

(10) Patent No.: US 10,644,286 B2
(45) Date of Patent: May 5, 2020

(54) SECONDARY BATTERY WITH VENTING MECHANISM

(71) Applicant: FARASIS ENERGY, INC., Hayward, CA (US)

(72) Inventors: Keith Kepler, Hayward, CA (US); Jackson Edwards, Hayward, CA (US); Andrew Larson, Hayward, CA (US); Benjamin Zeiger, Hayward, CA (US)

(73) Assignee: FARASIS ENERGY (GANZHOU) CO., LTD., Ganzhou (CN)

( * ) Notice: Subject to any disclaimer, the term of this patent is extended or adjusted under 35 U.S.C. 154(b) by 0 days.

(21) Appl. No.: 15/493,586

(22) Filed: Apr. 21, 2017

(65) Prior Publication Data

US 2017/0309878 A1 Oct. 26, 2017

Related U.S. Application Data

(60) Provisional application No. 62/326,161, filed on Apr. 22, 2016.

(51) Int. Cl.
*H01M 2/12* (2006.01)
*H01M 10/0525* (2010.01)
*H01M 2/10* (2006.01)

(52) U.S. Cl.
CPC ....... *H01M 2/1229* (2013.01); *H01M 2/1077* (2013.01); *H01M 10/0525* (2013.01); *H01M 2220/20* (2013.01)

(58) Field of Classification Search
CPC .... H01M 2/1077; H01M 2/12; H01M 2/1229; H01M 10/0525; H01M 10/647; H01M 2220/20
See application file for complete search history.

(56) References Cited

U.S. PATENT DOCUMENTS

| | | | | |
|---|---|---|---|---|
| 2008/0090137 | A1* | 4/2008 | Buck | H01M 2/1077 429/120 |
| 2013/0266832 | A1* | 10/2013 | Shirasawa | H01M 2/1077 429/61 |
| 2015/0295208 | A1* | 10/2015 | Schumann | H01M 2/02 429/50 |
| 2016/0197386 | A1* | 7/2016 | Moon | H01M 2/1077 429/120 |

FOREIGN PATENT DOCUMENTS

WO WO-2015030405 A1 * 3/2015 .......... H01M 2/1077

* cited by examiner

*Primary Examiner* — Raymond Alejandro
(74) *Attorney, Agent, or Firm* — Volpe and Koenig, P.C.

(57) ABSTRACT

The present invention provides a secondary battery comprising a housing with an internal chamber and Li-ion pouch cells including electrical terminals exposed to the outside of the housing. The secondary battery further includes an venting mechanism made of compressible materials to form air pockets to relieve internally generated pressure inside of said internal chamber by venting of compressible material air pockets to the outside of the housing, and the Li-ion pouch cells and the compressible materials are all encapsulated within a potting layer and located in said internal chamber of the housing.

10 Claims, 5 Drawing Sheets

SECONDARY BATTERY WITH VENTING MECHANISM

CROSS REFERENCE TO RELATED APPLICATION

This application claims the benefit of U.S. Provisional Patent Application No. 62/326,161, which was filed Apr. 22, 2016, is entitled "Battery Expansion Vent," and is incorporated herein by reference as if fully set forth.

FIELD OF THE INVENTION

The present invention relates to a secondary battery, particularly to a secondary battery with venting mechanism.

BACKGROUND

With the development of the need to reduce fuel consumption, more and more industrial areas require batteries to supply electricity to motors as the power source. For example, it is well known that automobiles or other vehicles are being designed to be electric vehicles instead of relying on traditional internal combustion engines. Therefore, the batteries (or battery packs) are usually made of at least one battery array including several cells so as to have more capacity with less volume, which proposes higher demand with regard to the heat sinking and venting system of batteries.

Pouch cell batteries are increasingly used due to good safety and high energy density. Normally, a pouch cell battery includes a series of Li-ion pouch cells arranged in an enclosed protecting housing. However, in some cases, for example over-charging or aging of Li-ion cells, pouch cells may expand. Therefore, the enclosed housing will face increased air pressure from inside so as to lead to potential safety risks. A solution to eliminate or at least alleviate the above-mentioned technical problem is needed.

SUMMARY

To solve this problem, we propose a secondary battery with a novel mechanism being able to relieve internally generated pressure inside of the internal chamber thereof, so that when the Li-ion pouch cells expands in service, the pressure inside of the said internal chamber is relieved, so as to ensure the safety of the secondary battery.

Therefore, the present invention provides a secondary battery comprising a housing with an internal chamber; Li-ion pouch cells including electrical terminals exposed to the outside of the housing, the secondary battery further includes an venting mechanism made of compressible materials to form air pockets to relieve internally generated pressure inside of said internal chamber by venting of compressible material air pockets to the outside of the housing, and the Li-ion pouch cells and the compressible materials all encapsulated within a potting layer and located in said internal chamber of the housing.

Advantageously, the venting mechanism includes at least one pathway connecting the inside space of said air pockets and the outside of the housing.

Advantageously, the venting mechanism includes at least one venting pathways, made of compressible material, interposed between the Li-ion pouch cells and the potting layer and connects to the outside of the housing.

Advantageously, the external ends of said venting pathways protrude from different external surfaces of the housing respectively.

Advantageously, the venting mechanism includes at least one one-way valve located at external ends of said venting pathway and allows the air inside of said air pockets to be released to the outside of the housing.

Advantageously, the air pressure inside of said air pockets is higher than that of the outside of the housing when said one-way valve is closed.

Advantageously, the venting pathways include at least one main pathway which connects to the outside of the housing and several branch pathways which fluidly communicate with said main pathway.

Advantageously, the venting pathway includes two main pathways parallel arranged with each other and several branch pathways parallel arranged between said two main pathways and connect the same.

Advantageously, each Li-ion pouch cell includes a cell body having cell tabs, a plurality of the Li-ion pouch cells are arranged adjacently with their corresponding cell tabs electrically connected and spacing rooms are formed between the cell tabs, the branch pathways are correspondingly located in the spacing rooms respectively.

Advantageously, the venting mechanism is located on the top of the Li-ion pouch cells.

Due to the above-mentioned technical characteristics, such a configuration contained within the secondary battery in accordance to the present invention has the advantage of being able to relieve internally generated pressure inside of said internal chamber by venting of compressible material air pockets to the outside of the housing, so that when the Li-ion pouch cells expands in service, the pressure inside of the said internal chamber relieved, so as to achieve the goal of the present invention.

Other features and advantages of the present invention will be explained specifically in the following detailed description of the embodiments.

BRIEF DESCRIPTION OF THE REFERENCE SIGNS

Figure 1:
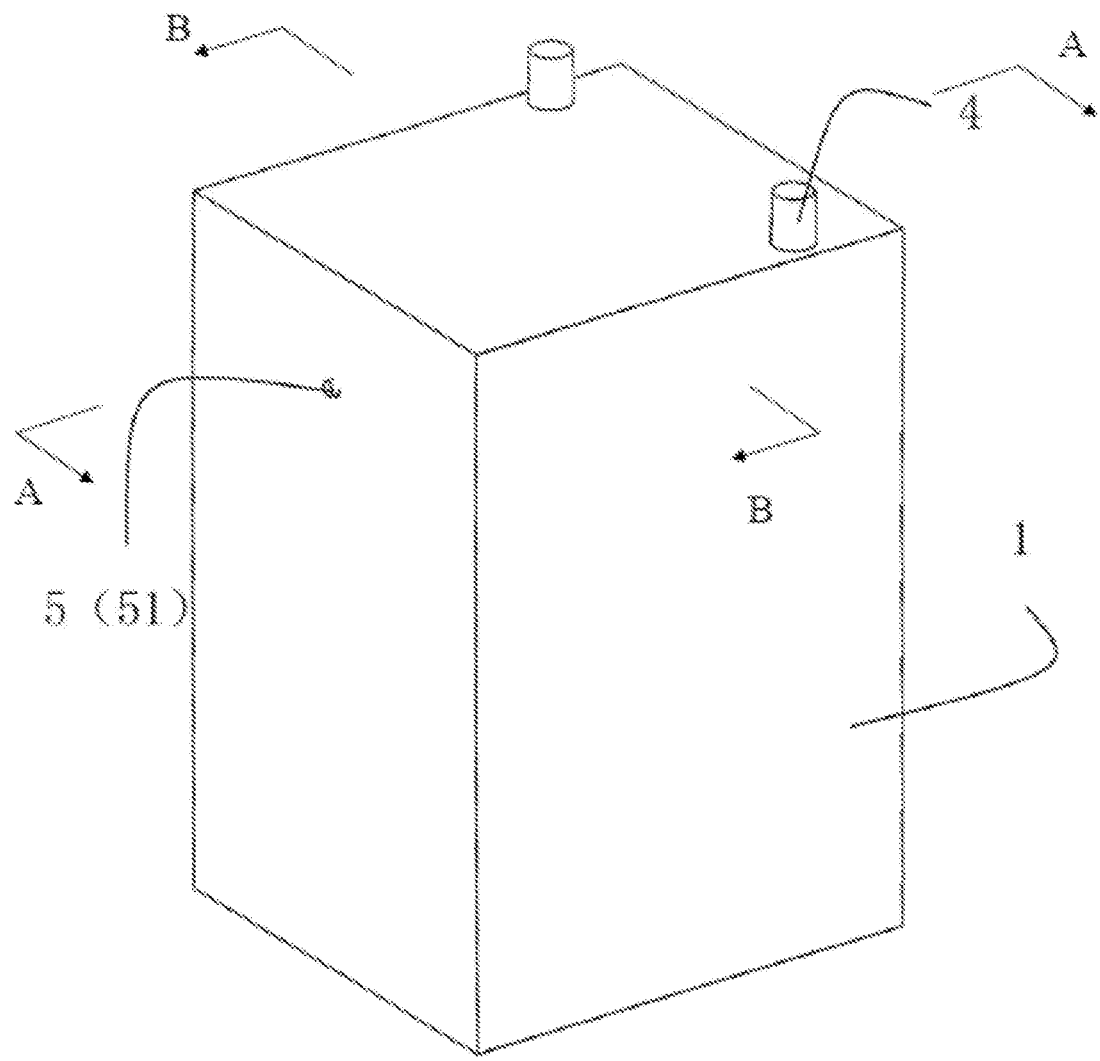
FIG. 1 shows a perspective view of a secondary battery in accordance with an embodiment of the present invention.

1: housing; 2: Li-ion pouch cells; 3: potting layer; 4: electrical terminal(s); 5: venting mechanism; 51: external end(s); 52: main pathway; 53: branch pathway(s).

DETAILED DESCRIPTION

Hereunder the embodiments of the present invention will be specified in details. It should be appreciated that the embodiments described here are only provided to describe and explain the present invention, but shall not be deemed as constituting any limitation to the present invention.

According to the present invention, a secondary battery is provided, which includes: a housing 1 with an internal chamber; Li-ion pouch cells 2 including electrical terminals 4 exposed to the outside of the housing 1, the secondary battery further includes an venting mechanism 5 made of compressible materials to form air pockets to relieve internally generated pressure inside of said internal chamber by venting of compressible material air pockets to the outside of the housing 1, and the Li-ion pouch cells 2 and the compressible materials all encapsulated within a potting layer 3 and located in said internal chamber of the housing 1.

It should be percipient that the secondary battery of the present invention not only may be used for EV, but also may be extended to all lithium ion battery pack applications, such as portable electrical devices or stationary battery backups.

Figure 2:
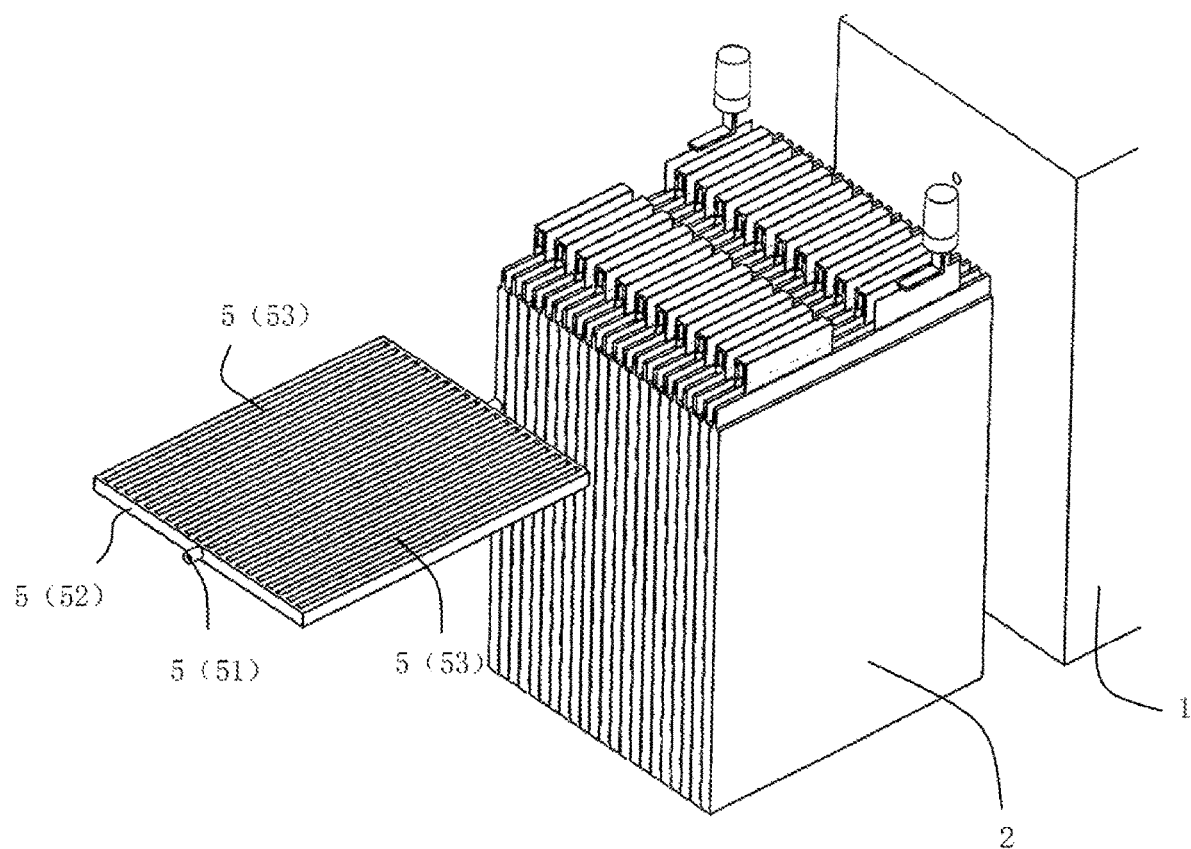
FIG. 2 shows an exploded perspective view of the secondary battery of FIG. 1 with potting layer and a part of housing omitted for clarity.

In practice, the Li-ion pouch cells 2 may include at least one Li-ion pouch cell comprising a sealed enclosure and electrode material in liquid or slurry state enclosed therein. However more commonly, as shown in FIG. 2, the Li-ion pouch cells 2 may include several pouch cells. The technical solution of the present invention is widely applicable for any kind of Li-ion pouch cell pack design.

The housing 1 provides the entire structure and outer shape of the battery with an internal chamber for mounting potting layer 3 and the air pockets encapsulated within the potting layer 3. The compressible material may be used for receiving or absorbing the expansion of the Li-ion pouch cells 2. Although the housing 1 is shown to be cuboid shape, the present invention is not limited to this and applicable to other shape of housing. Electrical terminals 4 connect to the Li-ion pouch cells 2 and exposed to the outside of the housing 1 through the potting layer 3 and housing 1.

As stated above, it is mainly different from the traditional technical solution that, in the present technical solution, an venting mechanism 5 which is used for relieve internally generated pressure inside of said internal chamber by venting of compressible material air pockets to the outside of the housing 1 is arranged, so that when the Li-ion pouch cells 2 expands in service, the pressure inside of the said internal chamber is relieved, for example, by the air inside of said internal chamber is allowed to flow to the outer environment in a controllable way, so as to achieve the goal of the present invention.

The air pocket venting mechanism 5 may have any variants on the basis of relieving internally generated pressure inside of said internal chamber by venting of compressible material air pockets to the outside of the housing 1. According to one embodiment of the present invention, the venting mechanism 5 includes at least one pathway connecting the inside space of said air pocket and the outside of the housing 1, and in this way, the inside space of said air pockets is directly communicated with the outside of the housing 1 through the pathway. For example, at least one through hole passing through the housing 1 and the potting layer 3 is provided. The communication between the inside space of said air pockets and the outside of the housing 1 is achieved by at least one pathway passing through the through hole and connected to the inside space of said air pocket, so that the air within the inside space of said air pockets may be vented outside. The through hole may be suitably located on the housing 1 to obtain its function without affecting the mounting of the Li-ion pouch cells 2. Further, the quantity and geometrical parameter of the through hole may be designed according to different working condition.

Figure 4:
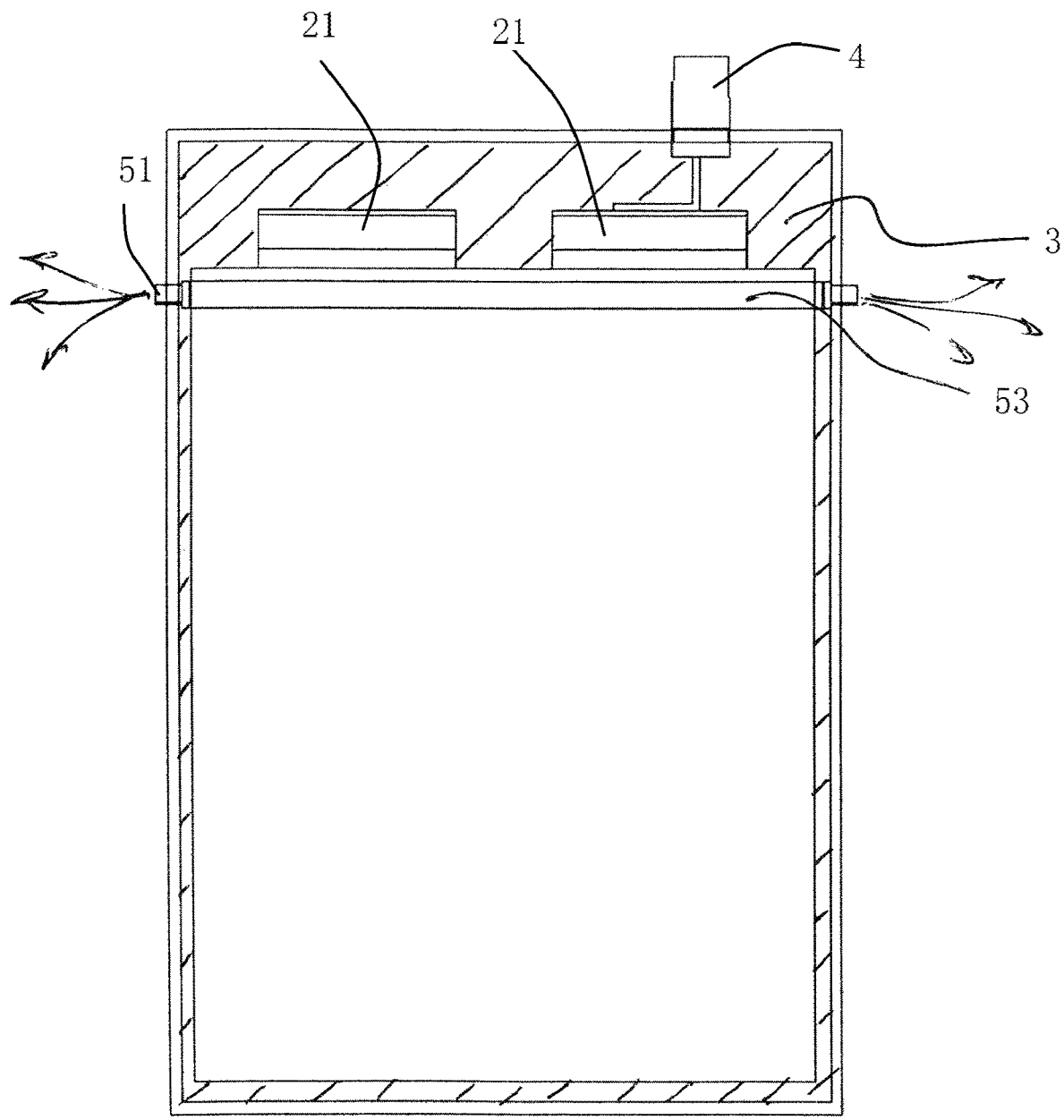
FIG. 4 shows a section view of the secondary battery of FIG. 1 along the direction of the line A-A of FIG. 1.

As clearly shown in FIG. 2 and FIG. 4, according to an embodiment of the present invention, the venting mechanism 5 includes at least one venting pathway interposed between the Li-ion pouch cells 2 and the potting layer 3, particularly, the venting tube is made of compressible material and connects to the outside of the housing 1. Specifically, the venting pathway extends from the inside of the air pockets to the outside of the housing 1, so as to relieve internally generated pressure inside of said internal chamber to the outside of the housing 1.

To be specific, the venting pathway includes external ends 51 protrude from different external surfaces of the housing 1 respectively. For example, the external ends 51 of the embodiment shown in FIG. 4 protrude from two opposite surfaces of the housing 1, and certainly other surfaces may be selected as required. However, it should be understand that, the present invention does not limit to this, and the venting pathway may be other forms, for example, the external ends 51 of the venting pathway may be co-plane or more interior than the external surface of the housing 1.

For the portion of the venting pathway inside of the housing 1, different designs can be contemplated. As for one embodiment, the venting pathway includes at least one main pathway 52 which connects to the outside of the housing 1 and several branch pathways 53 which fluidly communicate with said main pathway 52. Specifically, the main pathway 52 may connect to the outside of the housing 1 by the external ends 51 protruding wherefrom, and in this case, the communication between the inside of the air pockets and the outside of the housing 1 is achieved to vent the air inside the air pockets to outside by passing the branch pathways 53, main pathway 52 and the external ends 51 successively, and consequently, the internally generated pressure inside of said internal chamber is relieved.

Preferably, as shown in FIG. 2, the venting pathway includes two main pathways 52 parallel arranged with each other and several branch pathways 53 parallel arranged between said two main pathways 52 and connect the same. In the embodiment of FIG. 2, the venting pathway includes two external ends 51, two main pathways 52 and several branch pathways 53. Each of the external ends 51 connects with the corresponding main pathway 52 on the first side (the side toward the external of the secondary battery) at the middle of the corresponding main pathway 52, the several branch pathways 53 run in parallel, and two ends of each branch pathway 53 connects with the corresponding main pathway 52 on the second side opposite to the first side in sequence along the main pathway 52, thus different areas of the inside space of the air pockets communicate with the main pathway 52 and then the external ends 51 to the outsides. However, the present invention dose not limit to this and the shape and features of the venting mechanism 5 may be differently designed according to different working condition, for example, the venting mechanism 5 may include curved pathway or zigzag shaped pathway, or some kind of pathway assembly connected by different pathways, and the main pathways 52 and branch pathways 53 may connected to be other shape.

Figure 3:
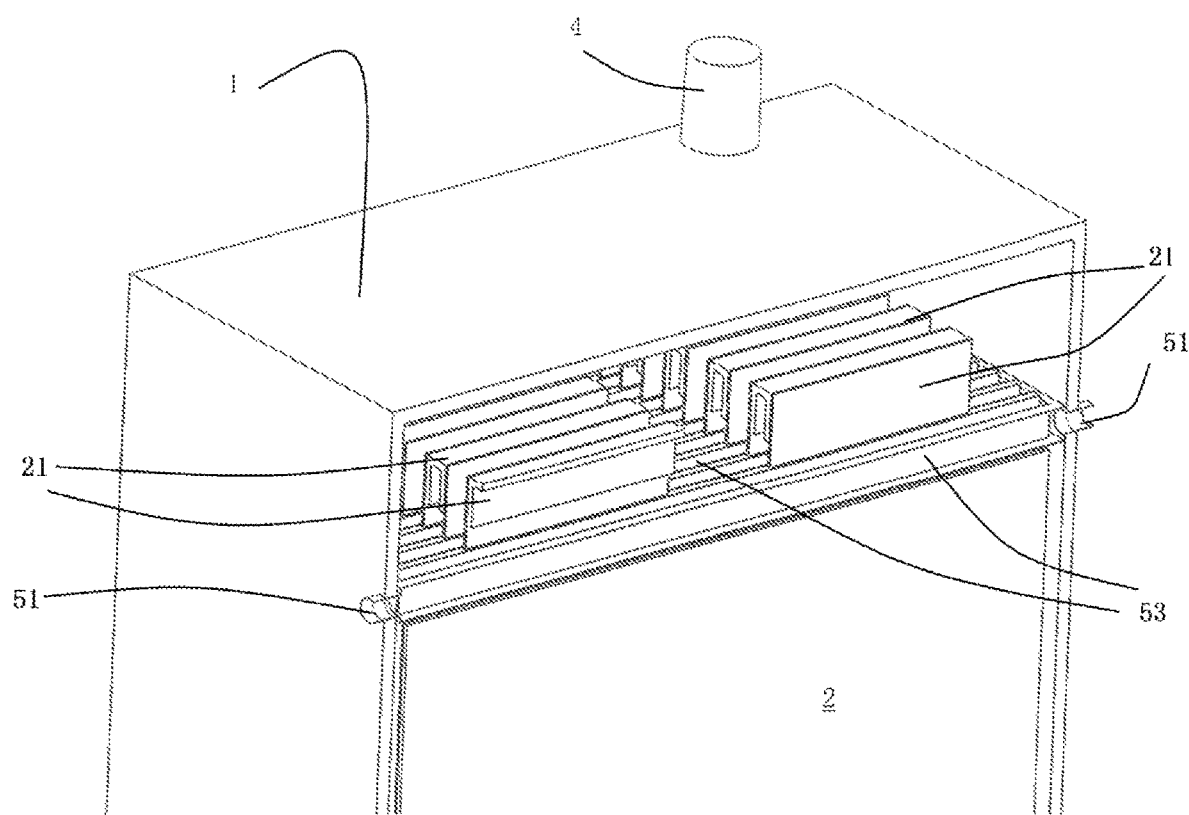
FIG. 3 shows the cross section of the secondary battery of FIG. 1, wherein the secondary battery is cut along the direction of the line A-A of FIG. 1, and for clarity, only the upper part of the secondary battery is show with potting layer omitted.
Figure 5:
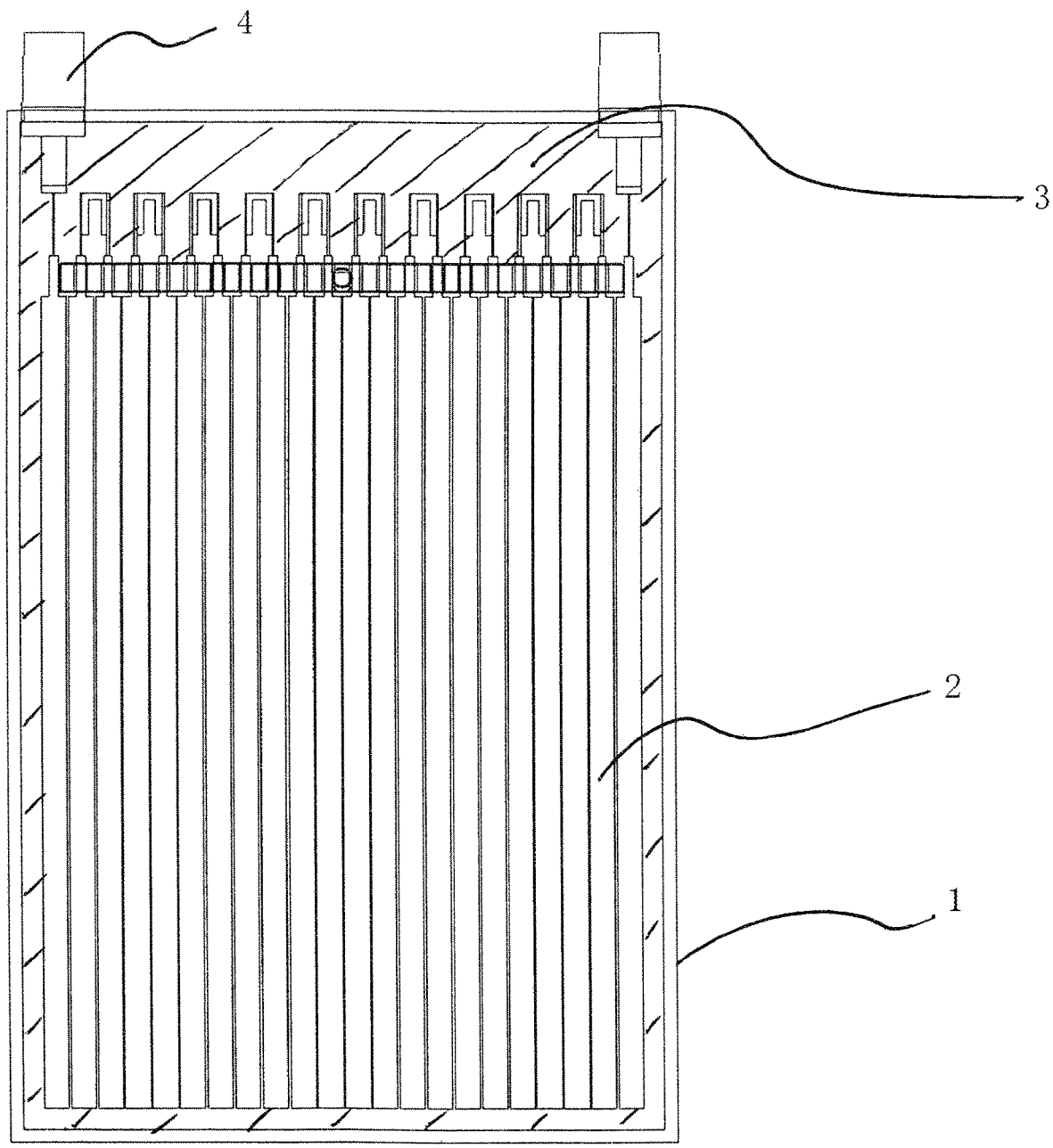
FIG. 5 shows a section view of the secondary battery of FIG. 1 along the direction of the line B-B of FIG. 1.

Further preferably, as shown in FIG. 2, FIG. 3 and FIG. 5, each Li-ion pouch cell includes a cell body having cell tabs 21, a plurality of the Li-ion pouch cells 2 are arranged adjacently with their corresponding cell tabs 21 electrically connected and spacing rooms are formed between the cell tabs 21, the branch pathways 53 are correspondingly located in the spacing rooms respectively. The corresponding cell tabs 21 of adjacent pouch cells are electrically connected in series or in parallel. Also, some of cell tabs 21 are kept apart from each other so that the spacing rooms are formed. Preferably, in order to achieve compact space layout to improve energy density, the branch pathways 53 are correspondingly located in the spacing rooms respectively as shown in FIG. 5.

In the preferably case, as shown in FIG. 5, the venting mechanism 5 is located on the top of the Li-ion pouch cells 2 when the secondary battery is used, the cell tabs 21 are normally on the top side.

As discussed above, the internal chamber of the housing 1 may directly communicate with the outside through the venting mechanism 5. However, in one preferable embodiment, the internal chamber of the housing 1 indirectly communicate with the outside, for example, the venting mechanism 5 includes at least one one-way valve which located at external ends 51 of said venting pathway and allows the air inside of said air pockets to be released to the outside of the housing 1. The one-way valve prevents the air flow from getting into the internal chamber of the housing 1 to avoid the influence on the internal chamber of the housing 1 from the outside, while prevent foreign matters from getting into the internal chamber of the housing 1.

Further, advantageously, the air pressure inside of said pocket is higher than that of the outside of the housing when said one-way valve is closed, which means the threshold air pressure to one-way open the valve is higher than the atmospheric pressure to establish the communication between the internal chamber of the housing 1 and the outside when the air pressure inside of said air pockets is higher than that of the outside of the housing 1, and to relieve internally generated pressure inside of said internal chamber by venting of compressible material air pockets to outside of the housing 1 timely, thereby ensure safe working condition of the secondary battery and avoid potential safety risks to some extent.

In addition, the compressible materials to form the air pockets may be positioned adjacent to the face of one or more the Li-ion pouch cells.

When used in this specification and claims, the terms "comprises" and "comprising" and variations thereof mean that the specified features, steps or integers are included. The terms are not to be interpreted to exclude the presence of other features, steps or components.

The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

What is claimed is:

1. A secondary battery including a housing with an internal chamber, and an arrangement of Li-ion pouch cells including electrical terminals exposed to the outside of the housing, wherein:

the secondary battery further includes a venting mechanism made of compressible materials having compressible air pockets to relieve internally generated pressure inside of said internal chamber by venting of the compressible material air pockets to the outside of the housing, the compressible materials configured to receive or absorb expansion of the Li-ion pouch cells, and the Li-ion pouch cells and the compressible materials are encapsulated within a potting layer and located in said internal chamber of the housing, the venting mechanism includes at least one one-way valve allowing the air pressure inside of said air pockets to be released to the outside of the housing, and the air pressure inside of said air pockets is higher than that of the outside of the housing when said at least one one-way valve is closed, said venting mechanism is thereby configured to relieve internally generated pressure inside of said internal chamber to ensure safe working condition of the secondary battery and avoid potential safety risks raised by expansion of the Li-ion pouch cell in service.

2. The secondary battery according to claim 1, wherein the venting mechanism includes at least one pathway connecting the inside space of said air pockets and the outside of the housing.

3. The secondary battery according to claim 1, wherein venting mechanism includes at least one venting pathway, made of compressible material, interposed between the Li-ion pouch cells and the potting layer and connects to the outside of the housing.

4. The secondary battery according to claim 3, wherein there is more than one of the at least one venting pathway and the external ends of each of said at least one venting pathway protrude from different external surfaces of the housing respectively.

5. The secondary battery according to claim 4, wherein each one-way valve located at a respective external end each of said at least one venting pathway.

6. The secondary battery according to claim 3, wherein the at least one venting pathway includes at least one main pathway which connects to the outside of the housing and several branch pathways which fluidly communicate with said main pathway.

7. The secondary battery according to claim 6, wherein the at least one venting pathway includes two main pathways arranged parallel with each other and several branch pathways arranged parallel between said two main pathways and connecting the same.

8. The secondary battery according to claim 6, wherein each Li-ion pouch cell includes a cell body having cell tabs, a plurality of the Li-ion pouch cells are arranged adjacent with their corresponding cell tabs electrically connected and spacing rooms are formed between the cell tabs, and the branch pathways are correspondingly located in the spacing rooms respectively.

9. The secondary battery according to claim 1, wherein the venting mechanism is located on the top of the Li-ion pouch cells.

10. The secondary battery according to claim 1, wherein the compressible materials are positioned adjacent to the face of one or more of the Li-ion pouch cells.

* * * * *